United States Patent
Wang et al.

(10) Patent No.: US 10,957,089 B2
(45) Date of Patent: Mar. 23, 2021

(54) ANIMATION GENERATION

(71) Applicant: INTERNATIONAL BUSINESS MACHINES CORPORATION, Armonk, NY (US)

(72) Inventors: Jian Jun Wang, Xi'an (CN); Yidan Lei, Shanghai (CN); Neng Zhang, Beijing (CN); Chi Yang Li, Beijing (CN); Mu Han Sun, Beijing (CN); Min Huang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/129,889

(22) Filed: Sep. 13, 2018

(65) Prior Publication Data

US 2020/0090395 A1 Mar. 19, 2020

(51) Int. Cl.
| | |
|---|---|
| *G06T 13/80* | (2011.01) |
| *G10L 25/63* | (2013.01) |
| *G06F 3/01* | (2006.01) |
| *G10L 15/26* | (2006.01) |
| *G06K 9/00* | (2006.01) |

(52) U.S. Cl.
CPC .............. *G06T 13/80* (2013.01); *G06F 3/017* (2013.01); *G06K 9/00302* (2013.01); *G10L 15/26* (2013.01); *G10L 25/63* (2013.01); *G06F 2203/011* (2013.01)

(58) Field of Classification Search
None
See application file for complete search history.

(56) References Cited

U.S. PATENT DOCUMENTS

| | | | | |
|---|---|---|---|---|
| 5,367,454 A | * | 11/1994 | Kawamoto | G06N 3/004 345/418 |
| 2008/0059570 A1 | * | 3/2008 | Bill | G06Q 10/10 709/203 |
| 2010/0091013 A1 | * | 4/2010 | Park | G06Q 30/02 345/419 |
| 2011/0273455 A1 | * | 11/2011 | Powar | G10H 1/368 345/473 |
| 2015/0121251 A1 | * | 4/2015 | Kadirvel | H04M 1/72544 715/753 |
| 2015/0332666 A1 | | 11/2015 | Dayan et al. | |

(Continued)

FOREIGN PATENT DOCUMENTS

| CN | 106131457 A | 11/2016 |
|---|---|---|
| CN | 104123545 B | 6/2017 |

OTHER PUBLICATIONS

Mitchel Broussard, "Messages in iOS 10: How to Use Emoji Replacement and Prediction", published on Sep. 13, 2016, retrieved from https://www.macrumors.com/how-to/ios-10-messages-emoji/ on Apr. 29, 2019.*

(Continued)

*Primary Examiner* — Zhengxi Liu
(74) *Attorney, Agent, or Firm* — Ewa M. Wozniak

(57) ABSTRACT

A method, a system and a computer program product for generating an animation are provided. In the method, an emotion change in a text is identified, and the emotion change contains one or more emotions. Images matching the emotion change are determined. And an animation file is generated based on the determined images.

20 Claims, 5 Drawing Sheets

(56) References Cited

U.S. PATENT DOCUMENTS

2016/0027057 A1   1/2016  Sullivan et al.
2017/0075878 A1*  3/2017  Jon .................... G06F 17/276
2017/0133054 A1   5/2017  Song et al.
2018/0336714 A1* 11/2018  Stoyles .............. G11B 27/036
2020/0047348 A1*  2/2020  Park .................. B25J 11/0015

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

ANIMATION GENERATION

BACKGROUND

The present invention relates generally to image processing, and more specifically, to generating an animation.

Social media is becoming more and more popular today for both individuals and enterprises. To attract a greater audience to a post on a social platform, animations such as animated Graphics Interchange Format (GIF) files are often used as a complement to text. Proper use of animation in the post can help make the text vivid and may leave a deeper impression on the audience. However, the generation of such animation remains a manual and labor-intensive process, which can be both time-consuming and troublesome. It may require the author to gather source materials, sort out the most relevant and coherent images, and then compose them in an animation.

SUMMARY

According to at least one embodiment of the present invention, there is provided a method for generating an animation. In the method, an emotion change in a text is identified. The emotion change may contain one or more emotions. Images matching the emotion change are determined, and an animation file is generated based on the determined images.

According to at least one other embodiment of the present invention, there is provided a computer system and a computer program product for generating an animation, described in detail herein and considered a part of the claimed invention.

These and other features and advantages of the present invention may be described in detail and may become apparent to those of ordinary skill in the art in view of the following detailed description of the example embodiments of the present invention.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
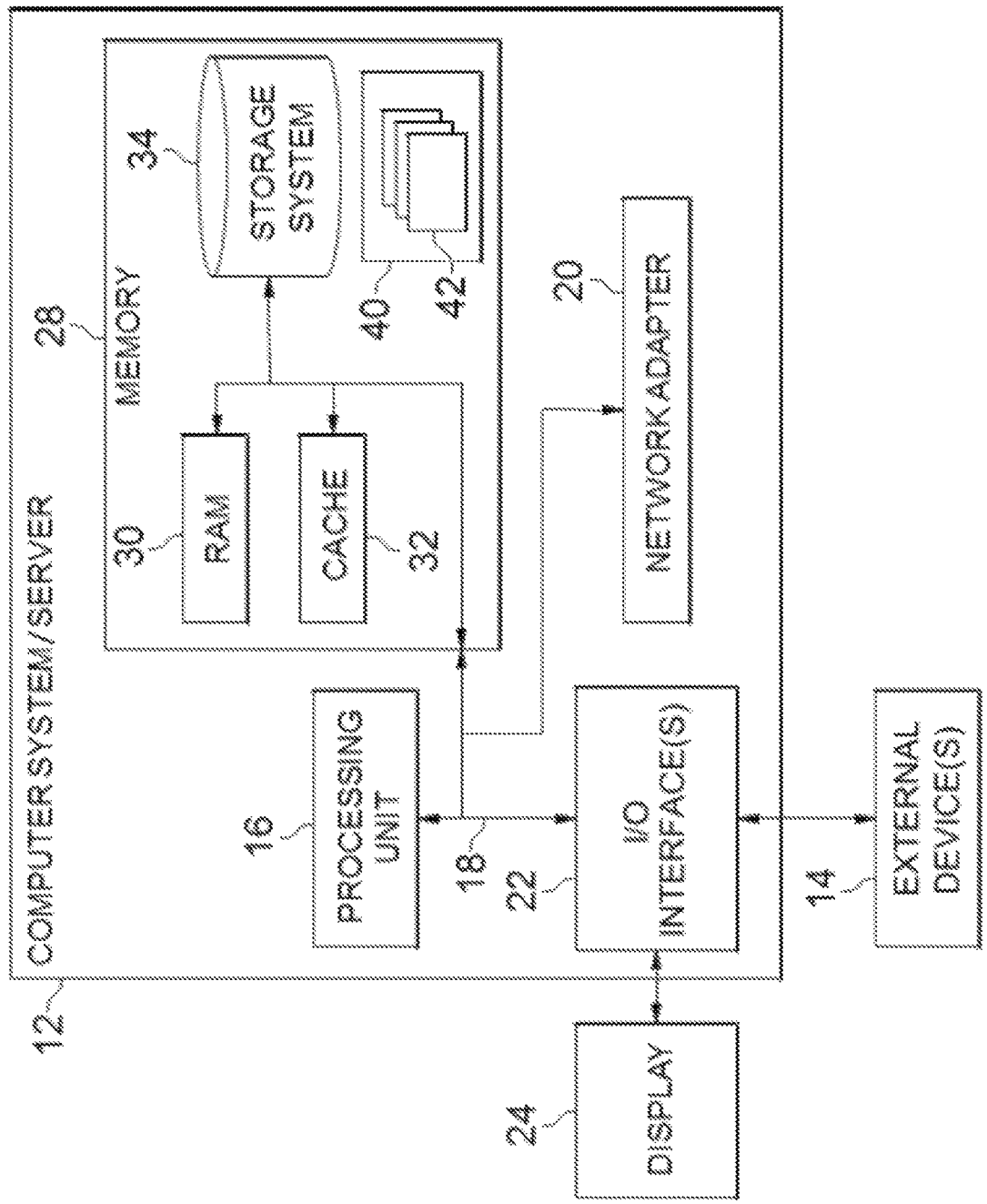
FIG. 1 depicts a cloud computing node according to at least one embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the present invention can be deployed on cloud computer systems which will be described herein. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a cloud computing node according to at least one embodiment of the present invention is depicted. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in a cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
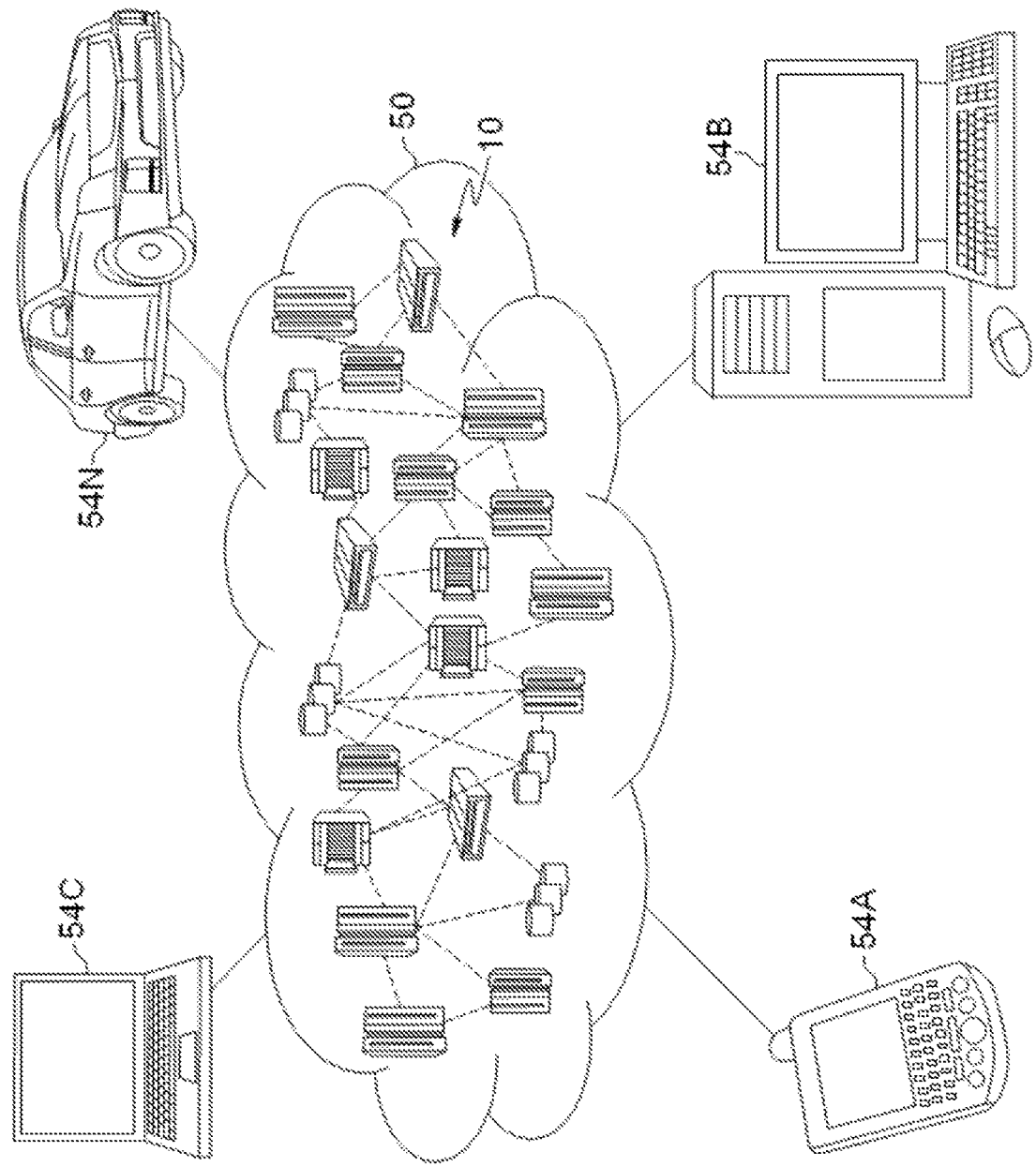
FIG. 2 depicts a cloud computing environment according to at least one embodiment of the present invention.

Referring now to FIG. 2, illustrative cloud computing environment 50 is depicted. As shown, cloud computing environment 50 includes one or more cloud computing nodes 10 (for example, the cloud computing node as described above with respect to FIG. 1) with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. Cloud computing nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
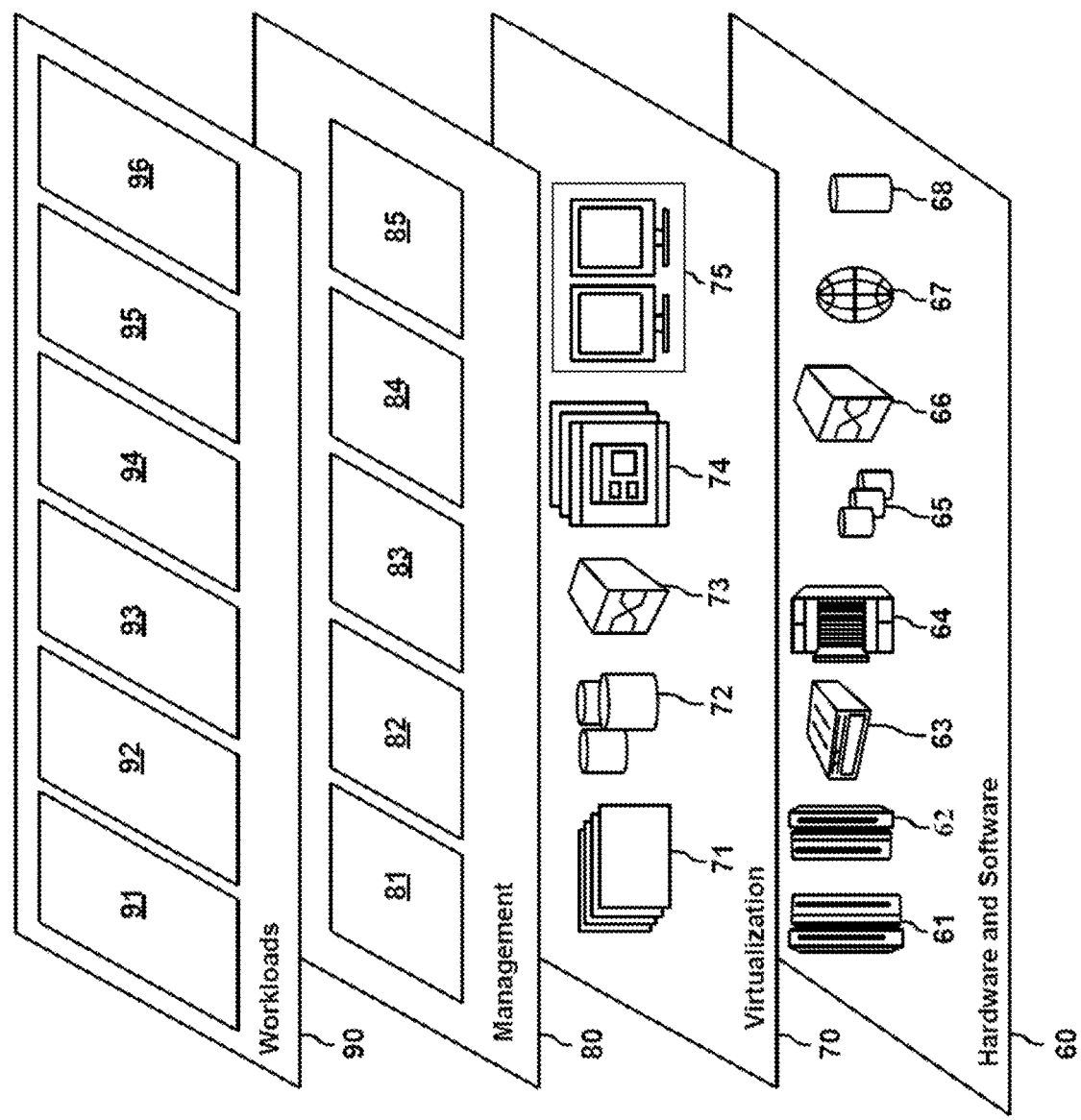
FIG. 3 depicts abstraction model layers according to at least one embodiment of the present invention.

Referring now to FIG. 3, a set of functional abstraction layers provided by cloud computing environment 50 (as described above with respect to FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and animation generating 96. Hereinafter, reference will be made in FIGS. 4 and 5 to describe details of the animation generating 96.

It is noted that, in addition to the cloud system described above, embodiments of the present invention can be implemented in any computer or network systems. Also the present disclosure is not limited to the computer system described above, for example, with reference to FIG. 1.

As referenced previously, animated GIF may be an image format that continuously displays multiple frames in a loop, and may have no sound. It has become dramatically popular in recent years on social networks. When a user wants to post a text on a social media platform, the user may want to use an animated GIF together with the text. However, it may not be easy to find an appropriate GIF which can exactly express the emotions that the user wants to express in the text, especially when the user wants to use the GIF to express an emotional change instead of a single emotion. One solution is for the user to manually generate a new GIF. However, as mentioned above, the generation of a GIF remains an entirely manual process, requiring the user to gather a lot of source materials, sort out the most relevant and coherent images and then compose them into an animation. A similar situation may exist for generation of other types of animation.

Therefore, a new method for generating an animation is proposed, which may generate an animation automatically for the user, which may express the emotional changes that the user wants to express in an article or in a text. Please note that in the context of the present disclosure, the term of animation may include animated images, animated pictures, or animated graphics, among other things, which refers to a dynamic format of images, with or without sounds. An animated GIF may be a typical example of an animation.

Figure 4:
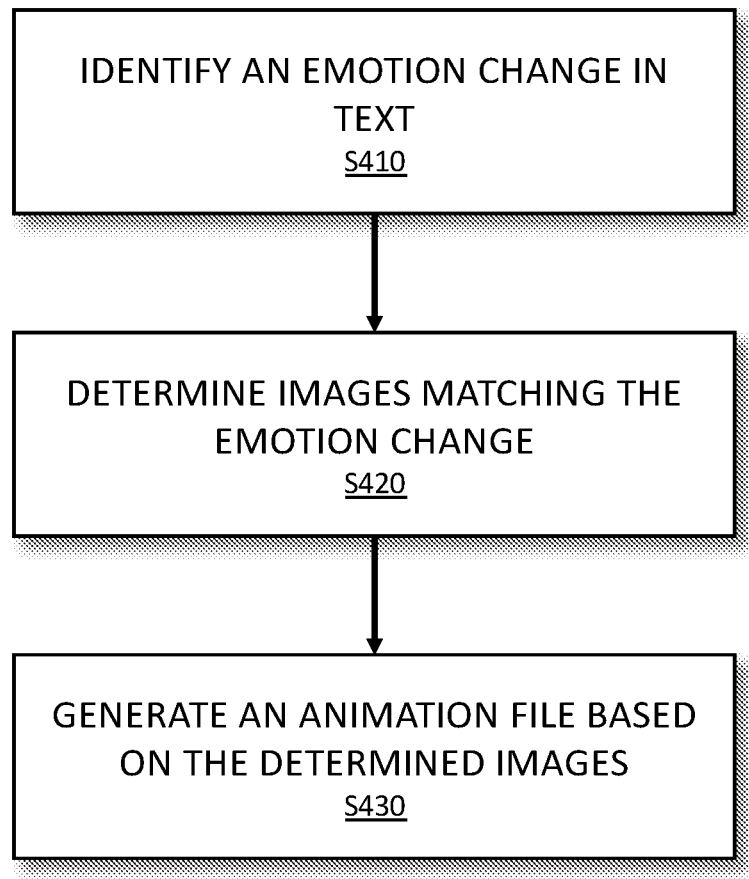
FIG. 4 depicts an example flow diagram of a method for generating an animation for a text according to an embodiment of the present invention.

FIG. 4 depicts an example flow diagram of a method for generating an animation for a text according to an embodiment of the present invention.

At S410, an emotion change in a text is identified. The emotion change may contain one or more emotions. In order to detect an emotion change in a text (e.g., in a newspaper, in an online article, or in an instant online message, among other forms of text communication), the animation generation program may parse the text and determine a theme of the parsed text. The animation generation program may further determine all emotional changes occurring within the parsed text. An intelligent machine learning engine, including a Watson™ (Watson and all Watson-based trademarks are trademarks or registered trademarks of International Business Machines Corporation in the United States, and/or other countries) application programming interface (API) may be utilized to parse the text and detect emotional changes.

According to an embodiment of the present invention, the emotion may be expressed by any suitable means. For example, different emotional states may be used to express different emotions. There may be six emotional categories that are widely used to describe a human's basic emotions. These may include joy, sadness, surprise, anger, fear, and disgust. It should be understood that more or less emotional states may be used to express a user's emotion. Alternatively, the emotions may be expressed by numerical value, with different values (or different value ranges) corresponding to different emotions.

An emotion change may include a sequence of emotions. For example, with the above mentioned emotional states, an emotion change may be expressed as: [Joy, Surprise, Sadness]. According to another embodiment of the present invention, the emotion change may further include an intensity factor within the text. For example, with an intensity ranging from 1 to 5, an emotion change may be expressed as: [Joy 3, Surprise 2, Sadness 5]. The intensity value may also be normalized between 0 and 1, and an emotion change may be expressed as [Joy 0.6, Surprise 0.4, Sadness 1]. According to another embodiment of the present invention, the emotion change may further include the duration of each emotion. For example, an emotion change may be expressed as: [Joy 1 s, Surprise 0.5 s, Sadness 0.5 s], which means the emotion of Joy lasts 1 second, the emotion of Surprise lasts 0.5 second and then the emotion of Sadness lasts 0.5 second.

It should be understood that any type of known or to be known techniques of emotion detection and recognition from text can be utilized to detect and recognize types of feelings through the expression of texts, including lexicon-based methods, machine learning, or a concept-level approach. For example, utilizing a machine learning approach, such as a deep learning technique, the animation generation program may analyze the text and obtain an emotion sequence from the text, which may form the basis of an emotion change.

At S420, images matching the emotion change are determined. According to an embodiment of the present invention, some candidate images may be determined first and then the metadata of the candidate images may be obtained. Images with metadata matching the emotion change may be selected from the candidate images. Reference will be made within the description of FIG. 5 to describe details of the steps of determining images matching the emotion change according to an embodiment of the present invention.

At S430, an animation file is generated based on the determined images. According to an embodiment of the present invention, the determined images may be compiled according to the sequence of the emotions contained in a detected emotion change. It should be understood that any type of known or to be known image composition technique can be utilized to generate an animation file from the images.

The generated animation file may be communicated to the user for display on the user's device.

To determine images matching the emotion change in the text, some candidate videos need to be obtained. Utilizing the candidate videos, candidate images may be obtained. Thereafter, images matching the emotion change may be selected from the candidate images. Candidate videos may be obtained from different sources and be obtained according to different criteria to meet the user's requirement.

Figure 5:
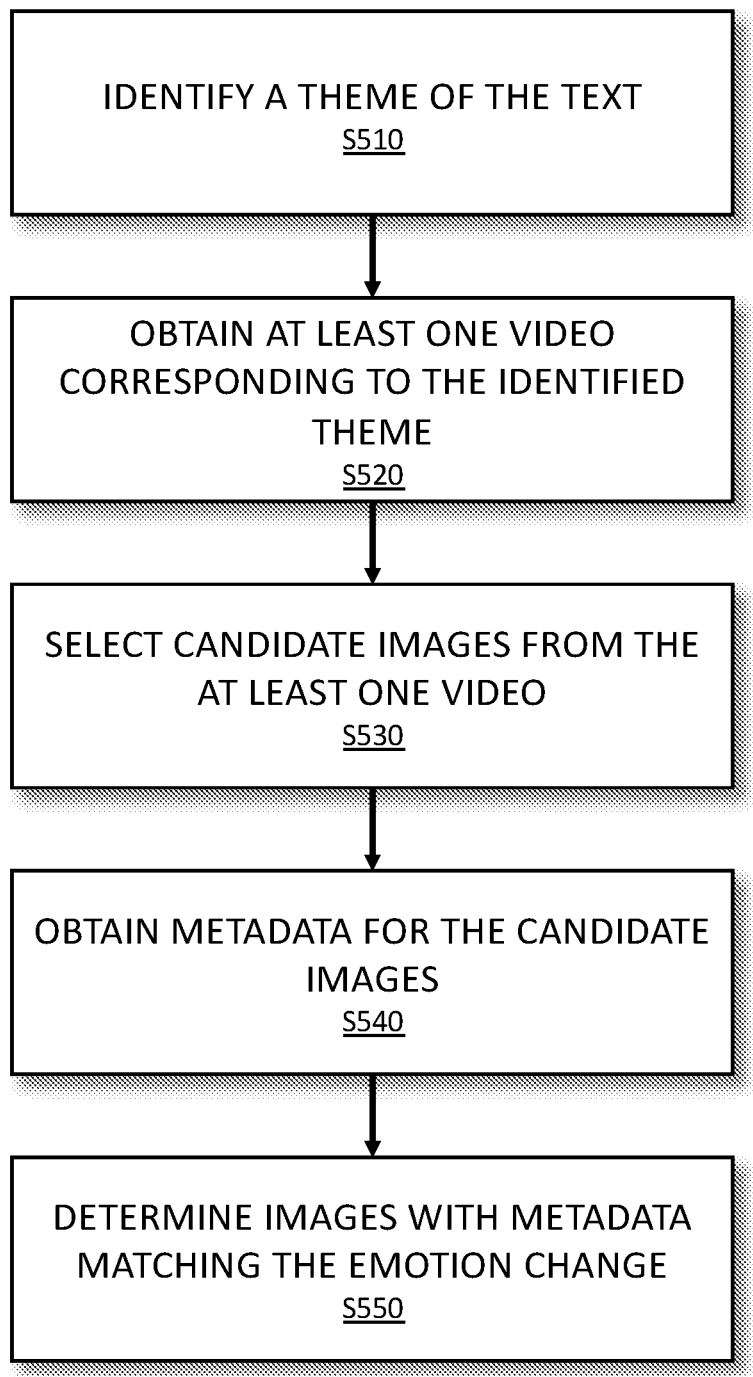
FIG. 5 depicts an example flow diagram of a step of determining images matching an emotion change in a text according to an embodiment of the present invention.

FIG. 5 depicts an example flow diagram of the step of determining images matching an emotion change in a text according to an embodiment of the present invention, and reference will be made to describe details of FIG. 5 below.

At S510, a theme of the text may be identified. The theme of the text may be identified by using any suitable text analyzing technology. According to an embodiment of the present invention, the theme of the text may be identified at the same time that the emotion change in the text is identified (as described previously at S410).

At S520, at least one video corresponding to the theme of the text may be obtained. For example, a video library may be established according to the theme of the text. The videos in the video library may be obtained from connected sources, including user input and/or the Internet, including video websites, and may be obtained utilizing the theme of the text as a filter. In order to limit the size of the video library, other factors, besides the theme of the text, such as the user's preference, may also be considered when obtaining the videos. For example, the user's preference may include the search history in a search engine by a user, the visit history in a video website by a user, including other user preferences. The animation generation program may collect the user's search history from browsing websites and historical data from video websites, and may obtain key information from the user's search history and historical data. Based on the obtained key information and the theme of the text, the system may obtain candidate videos. The candidate videos may then be used to construct the video library for a giver user.

At S530, candidate images may be selected from the at least one video. Different criteria may be used to select the candidate images. For example, the selected candidate images may be photographs of one same actor or character in a video. Alternatively, the selected candidate images may include photographs of different characters. The character may be designated by the user, or the character may be decided according to user preference, such as the user's visit history or watching history on a video.

According to at least one alternate embodiment of the present invention, the steps of S510, S520, or S530 may be omitted in determining images matching the emotion change in the text, and the candidate images may be obtained from any available sources of images and/or videos. For example, the candidate images may be obtained from the Internet, a library of images and/or videos, or a specific film, including other sources. However, by going through the steps of S510, S520, and S530, it may be more likely that the selected candidate images may more precisely fit the detected emotion, while also being limited to a reasonable volume (e.g., amount of videos and/or images).

According to at least one other alternate embodiment of the present invention, the steps of S510 and S520 may be omitted from determining images matching the emotion change in the text, and the at least one video may be designated by the user directly.

At a block S540, metadata for the candidate images may be obtained. Metadata of an image may contain emotion information indicating the emotion portrayed in the image. The metadata of the image may also contain other information, such as face orientation, face size, clothing, and background, among other characteristics. An analysis of the metadata, including emotion and face orientation, among other things, may enable the animation generation program to form an animated photograph which transitions smoothly between images which may not be taken in succession. There may, for example, be a time lapse between one or more images used to generate an animated photograph.

According to an embodiment of the present invention, the metadata for the candidate images may be generated after the candidate images are determined. According to at least one other alternate embodiment of the present invention, the metadata for each candidate image may have been generated in advance. In the latter case, the metadata may only need to be retrieved from the image.

It should be understood by one of ordinary skill in the art that any type of known or to be known image recognition, facial recognition and/or action recognition algorithm or techniques can be utilized to analyze the candidate images and to obtain metadata of the images, including emotion information, face orientation, face size, clothing, background, etc. Besides the emotion itself, the emotion information may also include an intensity value of the emotion, as described previously with respect to S410.

At S550, images with metadata matching the emotion change may be determined.

According to at least one embodiment of the present invention, the detected emotion information in the metadata may be used to match the change in emotion detected in the text. The animation generation program may extract one or more photographs from those identified with respect to step S520 above, which may match the change in emotion detected in the text. The orientation of the actor in the photographs may be fixed or may be gradually changing. The change in emotion of the actor in the photographs may match that of the change within the text. The background may also be fixed or gradually changing.

According to at least one embodiment of the present invention, images with metadata matching the emotion change may include images with metadata corresponding to an emotion value of the emotion contained in the emotion change. With the emotion information in the metadata, one or more images may be determined for each emotion contained in the emotion change. For example, for an emotion change [Joy 3, Surprise 2, Sadness 5], images with emotion of "Joy 3", "Surprise 2", "Sadness 5" may be selected from the candidate images respectively.

Alternatively, for each emotion in the emotion change, a plurality of images (i.e., one or more images) may be selected. The plurality of images may have emotion information corresponding to the emotion value of each emotion.

Images with metadata matching the emotion change may include images with metadata corresponding to an intermediate emotion of the emotions contained in the emotion change. Some images with intermediate emotion status may be selected to connect the two emotions in the emotion change. For example, for an emotion change [Joy 3, Surprise 2, Sadness 5], images with emotion of "Joy 3," "Joy 2," "Joy 1," "Surprise 2," "Sadness 1," "Sadness 3," and "Sadness 5" may be selected from the candidate images respectively, in which the images with emotion of "Joy 2," "Joy 1," "Sadness 1," and "Sadness 3" are used to make the emotion change more smoothly. Under such situation, besides images with emotion of "Joy 3," "Surprise 2," "Sadness 5," images with emotion of "Joy 2," "Joy 1," "Sadness 1," "Sadness 3" are also considered a match to the emotion change [Joy 3, Surprise 2, Sadness 5].

If the emotion change includes the duration of each emotion, one or more images may be selected to fit the duration of the emotion. For example, for an emotion change expressed as: [Joy 1 s, Surprise 0.5 s, Sadness 0.5 s], which means the emotion of Joy lasts 1 second, the emotion of Surprise lasts 0.5 second and then the emotion of Sadness lasts 0.5 second, two images with emotion of Joy, one image with emotion of Surprise and one image with emotion of Sadness may be selected. The two images with emotion of Joy may have a different emotion intensity value to make the emotion change transition more smoothly. Alternatively, one image with emotion of Joy may be selected for the emotion change. The image with emotion of Joy may be set to be played longer (1 second) than the images of Surprise and Sadness (0.5 second) in the generated animation file.

In order to have a resulting animation file with good quality, orientation strategy and similarity of clothes/background may be considered when determining the images, based on the information of face orientation, face size, clothing, background etc. contained in the metadata of the images.

To provide a better effect on emotion expression, sound information corresponding to the images in the generated animation file may also be included. According to an embodiment of the present invention, the images matching the emotion change may include continuous frame images selected from a video. In such case, when generating the animation file, not only the determined images may need to be considered, but the sound information corresponding to the continuous frame images may also need to be obtained from the video and composed together.

Please note that although embodiments of the present invention are described with reference to FIGS. 4 and 5, wherein there is only one emotion change being identified from text, it should be understood that a plurality of emotion changes may be identified from the text and a plurality of animation files may be generated for the emotion changes.

According to at least one embodiment of the present invention, a computer program product of the present invention comprises a computer readable storage medium having program instructions embodied therewith, and the computer readable storage medium is not a transitory signal per se. The program instructions are readable by a device to cause the device to perform a method of the present invention.

According to at least one embodiment of the present invention, a computer system of the present invention comprises one or more processors, a memory coupled to at least one of the processors, and a set of computer program instructions stored in the memory and executed by at least one of the processors to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating an animation, the method comprising:
    identifying, by one or more processing units, an emotion change in a body of text, the emotion change containing one or more emotions in a sequence of the one or more emotions wherein each of the one or more emotions has an intensity value and a duration, the intensity value is generated from the body of text;
    determining, by the one or more processing units, one or more images, from one or more videos, with metadata matching the identified emotion change, the metadata indicating the one or more emotions portrayed in the one or more images, wherein the determining the one or more images from the one or more videos further comprises obtaining, by the one or more processing units, the one or more videos corresponding to a theme of the body of text and selecting, by the one or more processing units, one or more candidate images from the one or more videos, the one or more videos are obtained from a video library, the video library is established based only on a user's search history in a search engine and a visit history in a video website; and generating, by the one or more processing units, an animation file based on the determined one or more images, the determined one or more images are selected from the one or more candidate images, the determined one or more images are compiled according to the sequence of the one or more emotions contained in the identified emotion change.

2. The method of claim 1, wherein identifying, by the one or more processing units, the emotion change in the body of text, the emotion change containing the one or more emotions in the sequence of the one or more emotions wherein each of the one or more emotions has an intensity rating and duration comprises:

parsing, by the one or more processing units, the body of text;

determining, by the one or more processing units, a sequence of one or more emotional categories expressing one or more emotions in the body of text; and establishing, by the one or more processing units, the intensity value for each of the one or more emotions in the sequence of one or more emotions.

3. The method of claim 1, wherein the determining, by the one or more processing units, the one or more images, from the one or more videos, with the metadata matching the identified emotion change further comprises:

obtaining, by the one or more processing units, a theme of the body of text;

obtaining, by the one or more processing units, metadata of the one or more candidate images; and determining, by the one or more processing units, one or more images of the one or more candidate images, with the metadata matching the identified emotion change.

4. The method of claim 3, wherein obtaining, by the one or more processing units, one or more videos corresponding to the theme of the body of text further comprises:

establishing, by the one or more processing units, the video library according to the theme of the body of text and a user preference; and obtaining, by the one or more processing units, at least one video from the video library.

5. The method of claim 3, wherein the obtained metadata of the one or more candidate images contains information indicating an emotion in the image.

6. The method of claim 5, wherein the obtained metadata of the one or more candidate images contains at least one of the following: emotion information, wherein the emotion information may contain an emotion and an intensity rating of the emotion, face orientation, face size, clothing and background of an image.

7. The method of claim 1, wherein the one or more images matching the emotion change includes images selected from the one or more videos, and wherein generating an animation file based on the determined one or more images and the sequence of one or more emotions further comprises:

generating an animation file based on the determined images in the sequence of one or more emotions and sound information corresponding to the determined one or more images obtained from the one or more videos.

8. A computer system for generating an animation, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying an emotion change in a body of text, the emotion change containing one or more emotions in a sequence of the one or more emotions wherein each of the one or more emotions has an intensity value and a duration, the intensity value is generated from the body of text;

determining one or more images, from one or more videos, with metadata matching the identified emotion change, the metadata indicating the one or more emotions portrayed in the one or more images, wherein the determining the one or more images from the one or more videos further comprises obtaining, by the one or more processing units, the one or more videos corresponding to a theme of the body of text and selecting, by the one or more processing units, one or more candidate images from the one or more videos, the one or more videos are obtained from a video library, the video library is established based only on a user's search history in a search engine and a visit history in a video web site; and generating an animation file based on the determined one or more images, the determined one or more images are selected from the one or more candidate images, the determined one or more images are compiled according to the sequence of the one or more emotions contained in the identified emotion change.

9. The computer system of claim 8, wherein the identifying the emotion change in the body of text, the emotion change containing the one or more emotions in the sequence of the one or more emotions wherein each of the one or more emotions has an intensity value and duration comprises:

parsing the body of text;

determining a sequence of one or more emotional categories expressing one or more emotions in the body of text; and establishing the intensity rating for each of the one or more emotions in the sequence of one or more emotions.

10. The computer system of claim 8, wherein the determining the one or more images, from the one or more videos, with the metadata matching the identified emotion change further comprises:

obtaining a theme of the body of text;

obtaining metadata of the one or more candidate images; and determining one or more images of the one or more candidate images with the metadata matching the identified emotion change.

11. The computer system of claim 10, wherein obtaining one or more videos corresponding to the theme of the body of text further comprises:

establishing the video library according to the theme of the body of text and a user preference; and obtaining at least one video from the video library.

12. The computer system of claim 10, wherein the obtained metadata of the one or more candidate images contains information indicating an emotion in the image.

13. The computer system of claim 12, wherein the obtained metadata of the one or more candidate images contains at least one of the following: emotion information, wherein the emotion information may contain an emotion and an intensity rating of the emotion, face orientation, face size, clothing and background of an image.

14. The computer system of claim 8, wherein the one or more images matching the emotion change includes images selected from the one or more videos, and wherein generating an animation file based on the determined one or more images and the sequence of one or more emotions further comprises:

generating an animation file based on the determined images in the sequence of one or more emotions and sound information corresponding to the determined one or more images obtained from the one or more videos.

15. A computer program product for generating an animation, comprising:

one or more tangible computer-readable storage media and program instructions stored on at least one of the one or more tangible computer-readable storage media, the program instructions executable by a processor to cause the processor to perform a method comprising:

identifying an emotion change in a body of text, the emotion change containing one or more emotions in a sequence of the one or more emotions wherein each of the one or more emotions has an intensity value and a duration, the intensity value is generated from the body of text;

determining one or more images, from one or more videos, with metadata matching the identified emotion change, the metadata indicating the one or more emotions portrayed in the one or more images, wherein the determining the one or more images from the one or more videos further comprises obtaining, by the one or more processing units, the one or more videos corresponding to a theme of the body of text and selecting, by the one or more processing units, one or more candidate images from the one or more videos, the one or more videos are obtained from a video library, the video library is established based only on a user's search history in a search engine and a visit history in a video web site; and generating an animation file based on the determined one or more images, the determined one or more images are selected from the one or more candidate images, the determined one or more images are compiled according to the sequence of the one or more emotions contained in the identified emotion change.

16. The computer program product of claim 15, wherein the identifying the emotion change in the body of text, the emotion change containing the one or more emotions in the sequence of the one or more emotions wherein each of the one or more emotions has an intensity value and duration comprises:

parsing the body of text;

determining a sequence of one or more emotional categories expressing one or more emotions in the body of text; and establishing the intensity rating for each of the one or more emotions in the sequence of one or more emotions.

17. The computer program product of claim 15, wherein the determining the one or more images, from the one or more videos, with the metadata matching the identified emotion change further comprises:

obtaining a theme of the body of text;

obtaining metadata of the one or more candidate images; and determining one or more images of the one or more candidate images with the metadata matching the identified emotion change.

18. The computer program product of claim 17, wherein obtaining one or more videos corresponding to the theme of the body of text further comprises:

establishing the video library according to the theme of the body of text and a user preference; and obtaining at least one video from the video library.

19. The computer program product of claim 17, wherein the obtained metadata of the one or more candidate images contains information indicating an emotion in the image.

20. The computer program product of claim 19, wherein the obtained metadata of the one or more candidate images contains at least one of the following: emotion information, wherein the emotion information may contain an emotion and an intensity rating of the emotion, face orientation, face size, clothing and background of an image.

* * * * *